H. A. MYERS.
BRAKE MECHANISM.
APPLICATION FILED DEC. 8, 1914.
1,182,402.
Patented May 9, 1916.
2 SHEETS—SHEET 1.
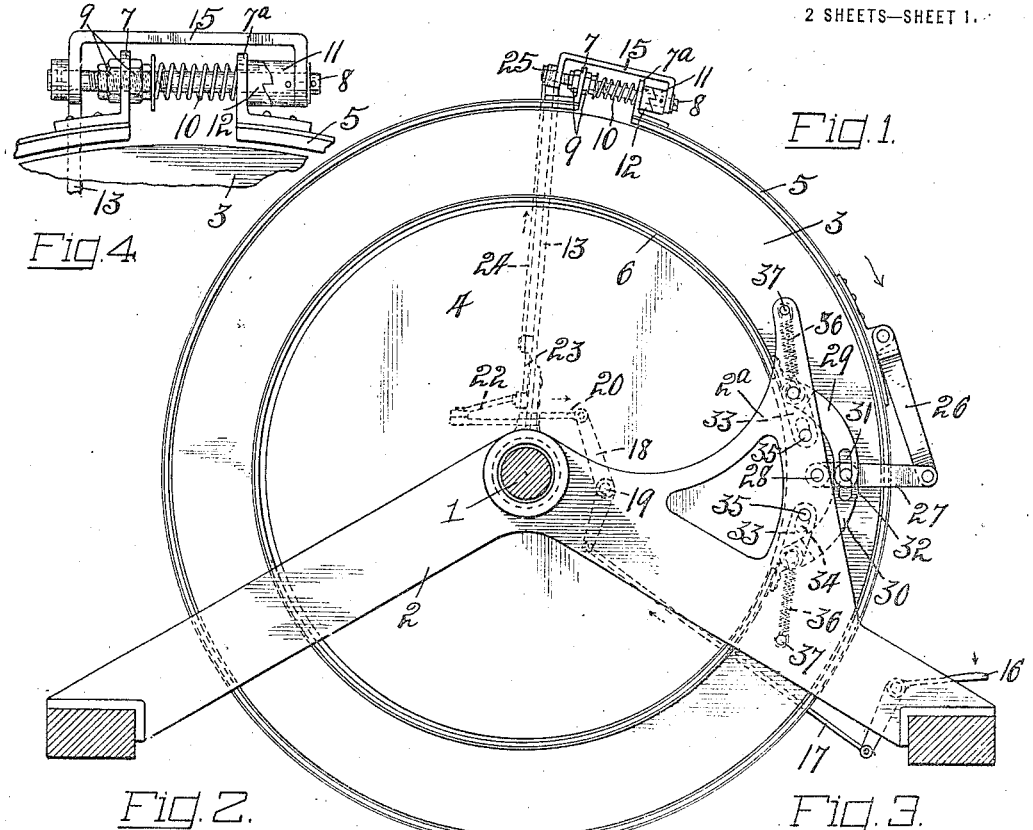
Fig. 1.
Fig. 4.
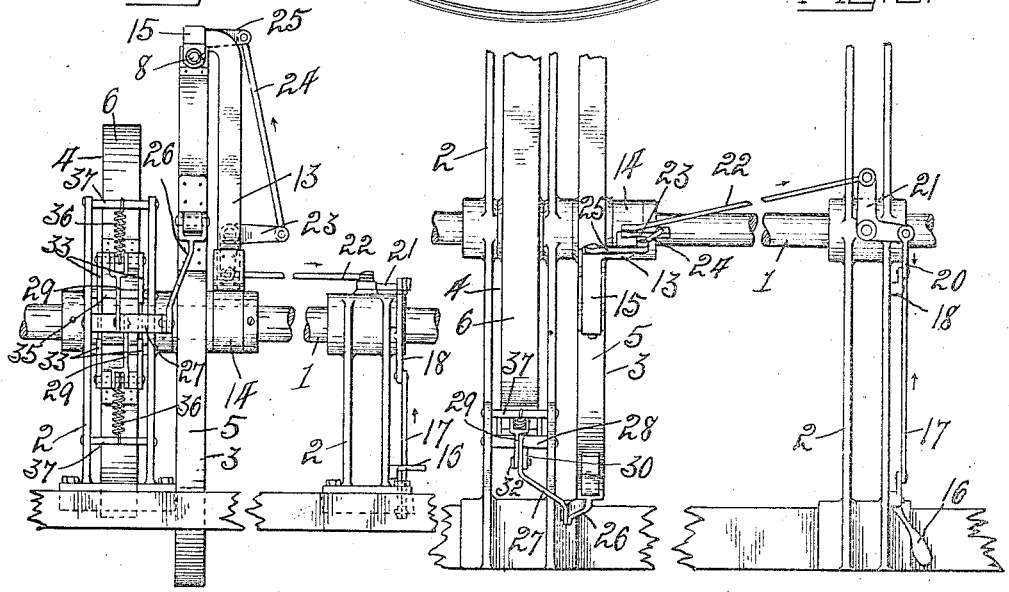
Fig. 2.
Fig. 3.
WITNESSES:
R. J. Allen
F. E. Aul
INVENTOR.
Hubert A. Myers,
By Owen, Owen & Crampton,
His attys.

UNITED STATES PATENT OFFICE.

HUBERT A. MYERS, OF TOLEDO, OHIO, ASSIGNOR OF ONE-HALF TO ARTHUR S. HICKOK, OF TOLEDO, OHIO.

BRAKE MECHANISM.

1,182,402.  Specification of Letters Patent.  Patented May 9, 1916.

Application filed December 8, 1914. Serial No. 876,033.

*To all whom it may concern:*

Be it known that I, HUBERT A. MYERS, a citizen of the United States, and a resident of Toledo, in the county of Lucas and State of Ohio, have invented a certain new and useful Brake Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for imparting a braking action to rotating elements.

The primary object of my invention is the provision of a simple and efficient manually controlled braking mechanism for a rotating part, which mechanism is automatically operable in part by the movement of said rotating part to impart a braking action thereto.

A further object of my invention is the provision of a mechanism of the character described, which is rendered operable by a slight and easy movement of a control part to impart a powerful and efficient braking action to a rotating part.

Further objects and advantages of the invention will be apparent from the following detailed description thereof.

The invention is fully described in the following specification, and while it is capable of use in numerous connections and of embodiment in numerous forms, two embodiments only thereof are illustrated in the accompanying drawings, in which,—

Figure 5:
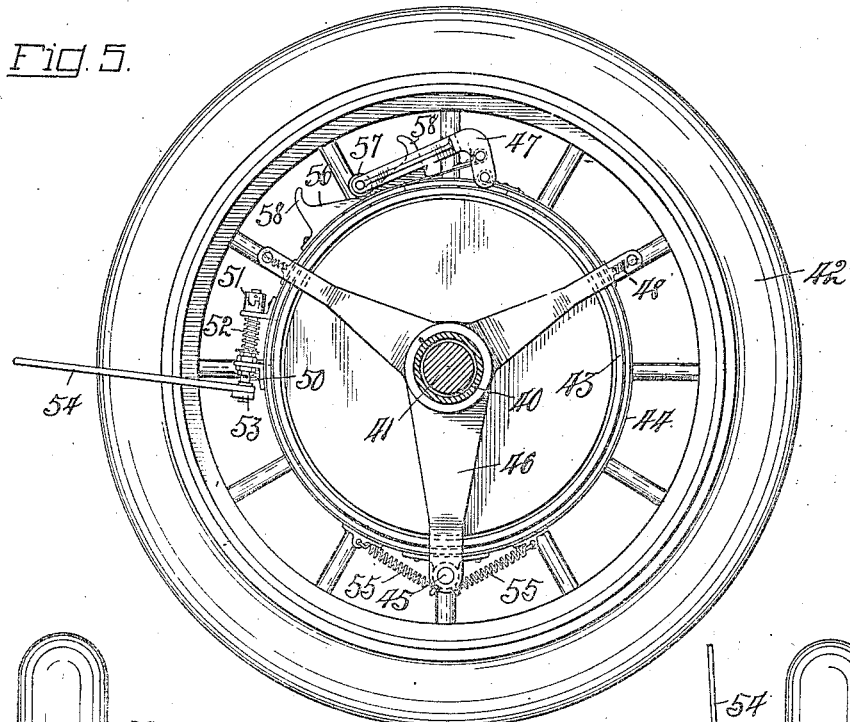
Figure 6:
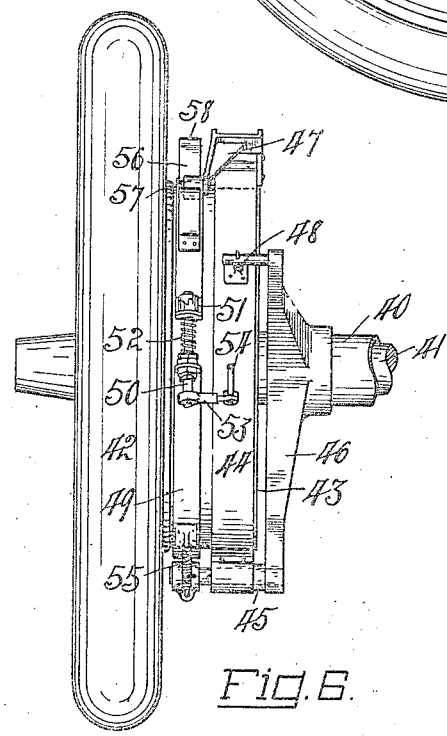
Figure 7:
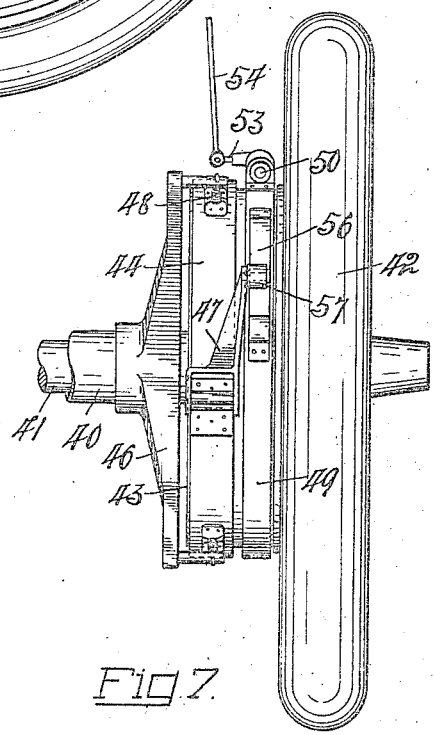

Figure 1 is a side elevation of a mechanism embodying the invention. Fig. 2 is a different reduced elevation thereof with parts broken away. Fig. 3 is a top plan view thereof with parts broken away. Fig. 4 is an enlarged detail of a portion of the mechanism, and Figs. 5, 6 and 7 are inner side, front and top plan views respectively of another form of my brake mechanism in connection with an automobile wheel.

Referring to the drawings, 1 designates a shaft, which is journaled in a frame part 2, and carries, in the present instance, a pair of wheels, drums or other rotating parts 3 and 4, which are fixedly connected through the shaft, or in any other suitable manner whereby in effect they are the same as a single member or part.

It will be understood that the rotary parts 3 and 4 may assume numerous forms and relative arrangements, and that their present embodiment and relative positioning is merely illustrative of the broad idea of the invention.

The rotary parts 3 and 4 are peripherally engaged by bands 5 and 6, respectively, of the split type. The band 5 has its ends terminating in adjacent spaced relation and provided with outwardly projecting ears 7, 7ª, which are apertured for the projection therethrough of a shaft 8. This shaft projects at its ends beyond the respective ears 7, and, while permitted to have rotary movements relative to both ears, it is prevented from longitudinal movements relative to the ear 7 by nuts 9, in the present instance, which nuts are threaded to the shaft at opposite sides of the ear. A coiled compression spring 10 is mounted on the shaft 8 between the two band ears and acts to urge a separation of said ears whereby to normally maintain the band in loose relation to the part 3 on which it is mounted.

The end of the shaft 8, which is disposed without the ear 7ª, in the present instance, fixedly carries a cam member 11, which, upon a rotation of the shaft 8 from normal position, coacts with a stationary cam 12, which is fixedly attached to the ear 7ª, and effects a drawing together of the band ends against the tension of the spring 10 and a consequent tightening of said band on the part 3. An arm 13 projects radially from the shaft 1 and has its inner end provided with a collar 14, which loosely encircles said shaft and has its outer end provided with a yoke 15, which is disposed without the periphery of the part 3 and has its arms provided with bearing openings in which the outer end portions of the cam shaft 8 are respectively journaled. It is thus evident that the shaft 8 and brake band 5 are supported from the shaft 1 independently of the part 3. It will be understood that the shaft 1 may be considered as any convenient part adapted for the supporting of the arm 13.

The shaft 8 has connection, through suitable connecting means, with a control part, which may be located at any convenient point of access. The control part, in the present instance, comprises a bell-crank form of lever 16, which is pivoted to any suitable part, as, for instance, a portion of the frame 2 at one side of the rotary part 3, and has one arm connected by a rod 17 to one arm of a lever 18 that is also shown, in the present instance, as being pivoted to the frame 2, as at 19. The other arm of the lever 18 is connected by a link or rod 20 to one arm of a bell-crank lever 21, which is likewise pivoted to the frame 2 near the shaft 1 and has its other arm connected by a rod or link 22 to one arm of a bell-crank lever 23, which, in the present instance, is pivotally carried by the arm 13 for radial rocking movements relative to the rotary part 3. A rod or link 24 connects an arm of the lever 23 to a crank-arm 25 projecting from an end of the cam shaft 8. The connection between the control lever 16 and shaft 8 is such, in the present instance, that the application of force to the free arm of the lever 16 will impart rotation to the shaft 8 in a direction to effect a contracting of the brake band 5 by reason of the coöperative action of the cam members 11 and 12. The coaction of the cams 11 and 12 is preferably such that an initial portion of a band contracting rotation of the shaft 8 will quickly contract the band substantially to element-gripping position and will then, upon a continued rotation of the shaft in the same direction, effect a more gradual and consequently more powerful frictional engagement of the band with its rotary part. This may be accomplished by making the initial portion of the cam of one of the cam members 11—12 more abrupt than the concluding end portion thereof, as is shown in Fig. 4. It will be understood that the band 5 when clamped to its part 3 will have a tendency to rotate therewith.

An arm 26 is pivotally attached at one end to the outer side of the band 5 adjacent to the point of separation of the ends of the brake band 6 and extends in substantially tangential relation to the band 5. The arm 26 has pivotal connection at its free end with one end of a link 27, which link extends inward from said arm toward the shaft 1 and has its other end provided, in the present instance, with oppositely projecting trunnions 28, which are journaled at their outer ends in portions $2^a$ of the frame 2, which frame portions are disposed at opposite sides of the rotary part 4 adjacent to the periphery thereof. The point of connection of the trunnions 28 with the frame portions $2^a$ is disposed intermediate the ends of the brake-band 6.

Projecting toward each other from the opposite ends of the brake-band 6, to which ends they are respectively pivoted, are two links 29 and 30, each of which is provided at its outer or free end, with relation to the band, with a longitudinally extending slot 31 into which the respective ends of a pin 32, that is carried by the link 27, without its trunnioned end, project. When the brake-band 6 is in its normal or released position with respect to the rotary part 4 the pin 32 stands at the outer end of each slot 31. It is thus evident that upon a rotary movement of the band 5 in the direction indicated by the arrow at the right of Fig. 1 the rocking movement, which is thereby imparted to the link 27, will cause the pin 32 to act against the outer end wall of the slot 31 and apply a pulling or tightening stress to the end of the brake band 6 to which the link 29 is connected. Accordingly upon a movement of the band 5 in the opposite direction, should it be impelled in such direction by the rotation of the part 3, when engaged therewith, will apply a pulling stress to the other end of the brake-band 6, or the end thereof to which the link 30 is attached. Each end of the brake-band 6 has a pair of links 33 pivotally projecting therefrom toward the pair at the other end of the band, and these links are provided with longitudinally extending slots 34 in their outer ends, which receive pins 35, which rigidly connect the frame parts $2^a$ without the periphery of the rotary part 4. A coiled contractile spring 36 connects each end of the brake-band 6 to respective pins or anchoring parts 37 projecting from convenient portions of the frame parts $2^a$, and these parts urge the ends of the band 6 to stand at the limit of their outward movements relative to the respective pins 35, as shown in Fig. 1. When a contracting stress is applied to either end of the band 6 such end has a movement relative to its anchoring pin 35 against the tension of the adjacent spring 36, while the opposite end of the band is held stationary due to the coaction of its pin 35 with the outer end walls of the slots 34 in the respective links 33.

It is evident that the application of very little pressure on the control lever 16 will suffice to actuate the connected cam mechanism to move the band 5 into gripping engagement with the rotary part 3, and that the rotative force which is then exerted on the band 5 by the rotary part will be communicated to the brake-band 6 and effect a firm clamping thereof to its rotary part 4, the braking force which is applied to the band 6 being very considerably greater than the gripping force that is applied to the band 5. It is thus apparent that when the control means has been initially moved to throw the parts into operative relation the momentum of the rotating means or member will then act in conjunction with the braking mechanism to automatically impart a powerful braking action to said means or member to stop or retard the rotation thereof. The force applied to the part 4 of said means or member depends on the force applied to the control member 16, as the more tightly the band 5 is clamped to its part 3 the less will be the tendency of one to slip with relation to the other.

The construction of the brake mechanism illustrated in Figs. 5, 6 and 7 differs mainly from the construction hereinbefore described in the manner of communicating a clamping action to the brake-band from a relative rotary movement of the control-band.

In Figs. 5, 6 and 7, 40 designates the rear tubular axle of an automobile, 41 the drive shaft exending through said axle, and 42 a wheel carried by the shaft. The wheel is provided on its inner side with the customary brake drum 43, with which the usual brake-band 44 coacts. This band is pivotally carried, in the present instance, by a pivot-stud 45, which projects from the outer end portion of one arm of a spider 46, which is carried by the axle 40. The ends of the band 44 are connected in spaced relation to one arm of an L-form of lever 47 in the customary manner. Springs 48 which project from respective arms of the spider 46 have connection with the brake-band 44 near its ends and coöperate with the stud 45 to normally retain the band in spaced relation to the drum. The control-band 49 for the brake-band 44 is mounted on the drum 43 at one side of the brake-band. The ends of the band 49 are connected and its contracting movements controlled in the same manner as described for the other form of the mechanism, 50 being the cam-shaft connecting the band ends, 51 the coacting cams thereon, 52 the spacing-spring, 53 the crank arm on the cam-shaft, and 54 the rod which connects the crank-arm to the control means, which means may be located at any convenient point in the automobile. Coiled contractile springs 55 project in opposite directions from the stud 45 and connect with the band 49. These springs hold the band 49 normally in one position relative to the brake-band 44. The band 49 is provided adjacent to the lever 47 with opposed inclines 56 with which a roller 57 which is carried at the outer end of the long arm of the lever 47 engages. When the band 49 is in normal position the roller 57 stands in neutral position between the inclines whereby a turning of the band 49 in either direction relative to the band 44 will move one or the other incline into engagement with the roller and impart a consequent brake-band contracting movement to the brake-band 44. Each incline is provided at its outer end with a hook or shoulder 58 to prevent the roller 57 passing over the outer end of either incline. It is evident that a drawing of the band 49 to the brake-drum when rotating will cause a partial movement of the band with the drum and move one incline under the roller 57 to effect a rocking of the lever 47 and a consequent application of the brake-band 44 to the brake-drum. Upon a release of the band 49 from engagement with the brake-drum the active spring 55 will return the band to normal neutral position.

I wish it understood that my invention is not limited to any specific construction, arrangement or form of the parts as numerous modifications may be made without departing from the spirit of the invention.

Having thus described my invention, what I claim as new, and desire to secure by Letters Patent, is,—

1. In combination, a rotatable member, a pair of friction bands operable to engage and release said member, and connection between said bands operable to cause one to grip said member when the other is in engagement with the member and moved thereby.

2. In combination, a rotatable member, a pair of bands operable to frictionally engage said member, one band being anchored against rotation with the member and the other band being capable of limited rotary movements therewith, and connection between said bands operable by a rotary movement of one to effect a member clamping action of the other to brake said member.

3. In combination, a rotatable member, a pair of friction elements relatively movable into and out of frictional engagement with said member and one of said elements being capable of rotary movements with said member, means operable by a rotary movement of one of said elements to impart a member engaging movement to the other of said elements, and means operable to quickly move the rotatable element into member engaging position and then to apply a slower and more powerful member-gripping movement thereto.

4. In combination, a frame, means rotatable relative to said frame, a brake band embracing a part of said means and having its ends anchored to said frame for limited relative to and fro movements, means yieldingly retaining the band ends at the limit of their outward movements, and means operable to frictionally engage said member and when so engaged and the member is rotating to coöperate therewith to effect a drawing of said band ends toward each other to impart a member braking movement to the band.

5. In combination, a frame, a member rotatable relative to said frame, a brake band for said member, means yieldingly retaining said brake band in released position, and means operable to frictionally engage said member and when engaged therewith to coöperate with said member when moving in either direction to impart member braking movements to said band.

6. In combination, a rotatable member, means operable to apply a braking action to said member and adapted to have limited rotary movements in either direction therewith, a brake band encircling a part of said member, and mechanism connecting said means and band and operable by a movement of said means in either direction with said member to apply a braking action to the member through said band.

7. In combination, a rotatable member, means operable to apply a braking action to said member and adapted to have limited rotary movements in either direction therewith, a friction band encircling a part of said member, a frame part, means yieldingly connecting said frame part and friction band for permitting limited movements of the band in either direction, and mechanism connecting said first means and said friction band and operable by a movement of said first means in either direction with said member to apply a braking action to said member through said band.

8. In combination, a rotatable member, means operable to apply a braking action to said member and adapted to have limited rotary movements in either direction therewith, a frame part, a friction band encircling a part of said member and having each end anchored to said frame part for limited movements relative thereto, means normally retaining said friction band in released relation to said member, and mechanism connecting said first means and friction band and operable by movements of said first means in either direction from normal position with said member to impart a contractile member braking movement to said band.

9. In combination, a frame part, a member rotatable relative to said frame part, means operable to apply a braking action to said member and adapted to have limited rotary movements in either direction therewith from normal position, a friction band encircling a part of said member and having each end anchored to said frame part for limited movements relative thereto to permit a contractile movement of either end portion of the band relative to said member, means acting on said friction band to retain the same normally expanded, and mechanism connecting said first means and the end portions of said band and operable to impart a contractile braking action to one end portion of the band when said first means is moved with the member in one direction, and vice versa.

10. In combination, a rotatable member, main and auxiliary brake bands encircling different parts of said member and each operable to apply a braking action to the member, said main member having limited rotary movements with said member in either direction of rotation thereof when clamped thereto, and means connecting said main band to the end portions of said auxiliary band and operable by a movement of the main band in either direction with said member to impart a contractile action to the auxiliary band.

11. In combination, a frame, a member rotatable relative to said frame, main and auxiliary brake bands encircling parts of said member, the main band having limited rotation from normal position with said member when clamped thereto and the member is rotated in either direction and said auxiliary band having both of ts ends anchored to said frame each for movements toward and away from the other end, means connecting said main band to both ends of said auxiliary band and having a part connected to said frame, said means being operable to impart contracting movements to one or the other end of said auxiliary brake band depending on the direction of rotation of said member when the main band is contracted thereon.

12. In combination, a frame, a member rotatable relative to said frame, a main brake band encircling said member and operable to clamp the same and to have limited rotary movements therewith in either direction of rotation of the member, an auxiliary brake band encircling a part of said member and having each end anchored to said frame for limited longitudinal movements relative thereto, springs connecting said frame and the end portions of said auxiliary band to normally retain said ends at the limit of their outward movement relative to the frame, means projecting from said main band and having separate connection with each end of said auxiliary band and operable upon a movement of the main band in one direction with the member to impart a contractile movement to one end of the auxiliary band and upon a movement of the main band in the opposite direction with said member to apply a contractile movement to the other end of the auxiliary band.

In testimony whereof, I have hereunto signed my name to this specification in the presence of two subscribing witnesses.

HUBERT A. MYERS.

Witnesses:
F. E. AUL,
R. G. ALLEN.